United States Patent

Fujimura

[11] Patent Number: 5,843,213
[45] Date of Patent: Dec. 1, 1998

[54] MOISTURE CONTROL UNIT

[75] Inventor: Yasuyuki Fujimura, Zushi, Japan

[73] Assignee: Kankyo Co., Ltd., Yokohama, Japan

[21] Appl. No.: 914,738

[22] Filed: Aug. 19, 1997

Related U.S. Application Data

[62] Division of Ser. No. 551,529, Nov. 1, 1995, Pat. No. 5,709,736.

[30] Foreign Application Priority Data

Nov. 24, 1994 [JP] Japan ................................. 6-312349
Dec. 2, 1994 [JP] Japan ................................. 6-324015

[51] Int. Cl.$^6$ ............................................. B01D 53/26
[52] U.S. Cl. ........................... 96/144; 55/400; 55/467.1; 55/472; 95/110; 95/113; 95/126; 96/146; 96/150
[58] Field of Search ............................... 55/269, 400, 404, 55/467, 472, 467.1; 95/110, 111, 113, 114, 115, 117, 123, 124, 126; 96/125, 126, 127, 144, 146, 150

[56] References Cited

U.S. PATENT DOCUMENTS

| | | | |
|---|---|---|---|
| 3,009,540 | 11/1961 | Munters | 95/123 |
| 3,009,684 | 11/1961 | Munters | 96/125 |
| 3,844,737 | 10/1974 | Macriss et al. | 95/123 |
| 4,012,206 | 3/1977 | Macriss et al. | 96/125 |
| 4,134,743 | 1/1979 | Macriss et al. | 96/125 |
| 4,497,361 | 2/1985 | Hajicek | 96/125 |
| 5,147,420 | 9/1992 | Claesson | 96/125 |
| 5,148,374 | 9/1992 | Coellner | 96/125 |
| 5,443,624 | 8/1995 | Claesson | 95/115 |

FOREIGN PATENT DOCUMENTS

| | | | |
|---|---|---|---|
| 33 45 109 A1 | 6/1984 | Germany | 95/124 |
| 52-19362 | 2/1977 | Japan | 95/123 |
| 61-40451 | 9/1986 | Japan | 95/123 |

*Primary Examiner*—C. Scott Bushey
*Attorney, Agent, or Firm*—Flynn, Thiel, Boutell & Tanis, P.C.

[57] ABSTRACT

A moisture control unit is made up of a housing and a moisture absorption rotor is rotatably supported in the housing. A fan is provided in an exterior wall of the housing and it feeds air into the housing. A heater is contained within the housing adjacent the rotor to evaporate moisture therefrom and a heat exchanger is also provided in the housing. The heat exchanger has a first passageway through which a portion of the air from the fan flows to absorb moisture from the rotor and a second passageway through which moisture-laden air flows from the rotor, the first and second passageways being in heat exchange relationship with each other.

2 Claims, 6 Drawing Sheets

MOISTURE CONTROL UNIT

This is a division of Ser. No. 08/551 529, filed Nov. 1, 1995, Now U.S. Pat. No. 5,709,736.

BACKGROUND OF THE INVENTION

1. Field of the Invention

The present invention relates to a moisture control unit, more particularly to a dehumidifying/humidifying device and a dehumidifier respectively employing a moisture absorption rotor and not needing piping.

2. Prior Art

There is a dry dehumidifying/humidifying device for dehumidifying and humidifying air.

As a conventional dry dehumidifying/humidifying device, air is dehumidified when the dry dehumidifying/humidifying device absorbs moisture in the air while the air is humidified by generating vapor when the air heated by a heater is permitted to pass through a moisture absorption rotor, and by humidifying the air by the thus generated vapor, wherein the moisture absorption rotor selects a range of air passage through which the air passes when it is rotated by a rotary driving source such as a motor.

However, such a conventional dehumidifying/humidifying device needs a rotary driving source for rotating the moisture absorption rotor or a power transmission means for transmitting power of the rotary driving source to the moisture absorption rotor, which causes problems in that the structure of the device becomes complicated, the manufacturing cost of the device is high, and the maintenance cost of the device is high because of the consumption of power.

There is a conventional dehumidifier for dehumidifying the moisture in air which is classified into two types, one is a dry dehumidifier and the other is a wet dehumidifier.

The dry humidifier is classified into a rotary dehumidifier as shown in FIG. 5 and a stationary dehumidifier as shown in FIG. 6.

The rotary dehumidifier in FIG. 5 comprises a rotary moisture absorption rotor a, two fans b and c, and a heater d, wherein air to be dehumidified is sucked by the fan c through the moisture absorption rotor a so that it is dehumidified, and the air heated by the heater d is discharged to another space by the fan b through the moisture absorption rotor a and a duct, not shown, so that the moisture absorption rotor a can be regenerated.

The stationary dehumidifier in FIG. 6 comprises two fans f and g provided in front of a moisture absorption element e, valves h, i, k, and m and a heater j, wherein air to be dehumidified is supplied to the moisture absorption element e by the fan g through the valve h and the dehumidified and dried air is discharged to space through the valve i. When the moisture absorption element e is to be regenerated, air at a high temperature is supplied to the moisture absorption element e by the fan f through the heater j and the valve k, and the air which becomes high in temperature and humidity is discharged to another space through the valve m and a duct, not shown.

The wet dehumidifier includes an evaporator, wherein the temperature of the air to be dehumidified is lowered by the evaporator so that the moisture in the air is changed into dew, and dew drop are stored in a container, etc. thereby dehumidifying the air.

However, in the conventional dry dehumidifier, since a plurality of fans are needed and the moisture which is taken out in the course of regenerating the moisture absorption element is discharged to another space, it is not easily installed and has high cost since duct piping work is needed.

The conventional stationary dehumidifier has such problems that the dehumidifier is complicated and expensive since it needs a plurality of valves and control units for controlling the opening and closing of these valves.

In the conventional wet dehumidifier, although a duct is not needed and air can be dehumidified in one space, it needs a heat pump, which has such problems that the dehumidifier is large-scaled and expensive and noise is generated during the operation of the dehumidifier. Further, even if the dehumidifier is used in a low temperature range, the surface of the evaporator becomes frosted, which lowers the dehumidifying capacity.

SUMMARY OF THE INVENTION

It is a first object of the invention to improve the drawbacks of the conventional dehumidifying/humidifying device and dehumidifiers, and to provide a moisture control unit which can be simplified in structure, of a small size and installed at a low cost without needing piping work.

To achieve the object of the invention, a moisture control unit according to a first aspect of the invention comprises a body which is partitioned by a partition wall into a plurality of chambers, a dehumidifying opening is provided in the chamber and a humidifying opening is provided in the chamber, a moisture absorption rotor is rotatably provided in the chambers so as to be located in each of the chambers, a heater is provided in one of the chambers adjacent to the moisture absorption rotor for evaporating water which is absorbed by the moisture absorption rotor.

In the first aspect of the invention, a part of the moisture absorption rotor which absorbs moisture from air is made heavy to thereby rotate downward due to the weight of water while a part of the moisture absorption rotor which is heated by a heater and from which water is evaporated is made light to thereby rotate upward. As a result, the moisture control rotor can rotate by itself without needing a rotary driving source.

A moisture control unit according to a second aspect of the invention comprises a body, a fan provided on a surface of the body, a moisture absorption rotor rotatably provided in the body, a sensible heat exchanger provided in the body, first and second passages provided in the sensible heat exchanger, and a heater provided in the body, wherein a part of the air which is fed through the fan and is to be dehumidified is supplied to the moisture absorption rotor where it is dehumidified, and then it is discharged outside the body, the remaining air in the body is supplied to the moisture absorption rotor after it passes the first passages and the heater so as to regenerate the moisture absorption rotor, and wherein air which is given a high humidity from the to regeneration of the moisture absorption rotor is supplied to the second passages of the sensible heat exchanger so as to form dew on the sensible heat exchanger, and dew drop are collected to perform dehumidification.

The moisture absorption rotor can be regenerated when the air heated by the heater is permitted to pass through the moisture absorption rotor which is given a high humidity after the moisture absorption rotor is dehumidified.

When air which is given a high humidity at the time of regeneration of the moisture absorption rotor 24 is permitted to pass through the second passages, the same air is cooled by the air which passes through the first passages so as to form dew in the second passages and dew drop are collected to dehumidify the air without needing a piping work, etc.

PREFERRED EMBODIMENT OF THE INVENTION

Figure 1:
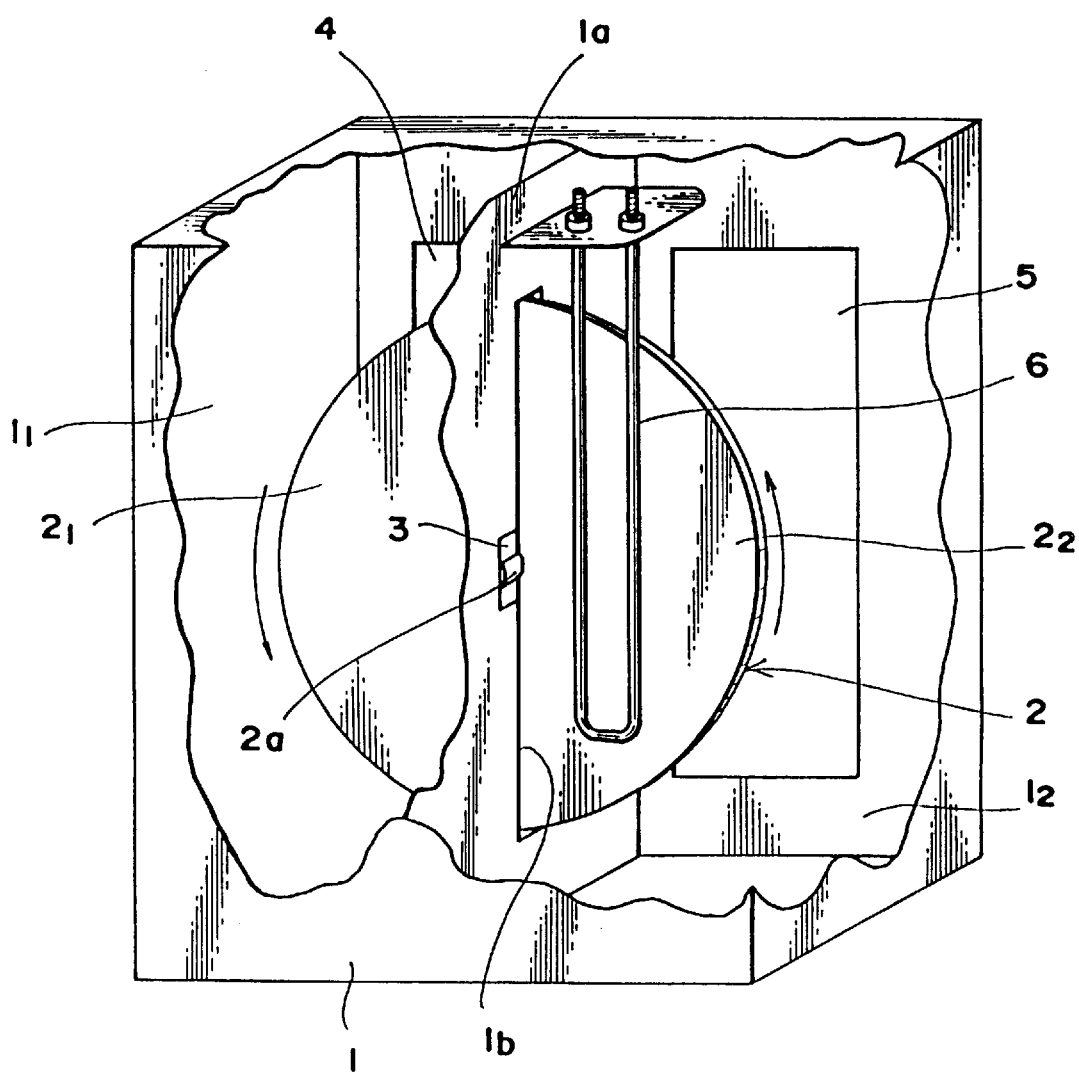
FIG. 1 is a view showing a principle of a dry dehumidifying/humidifying device serving as a moisture control unit according to a first aspect of the invention.
Figure 2:
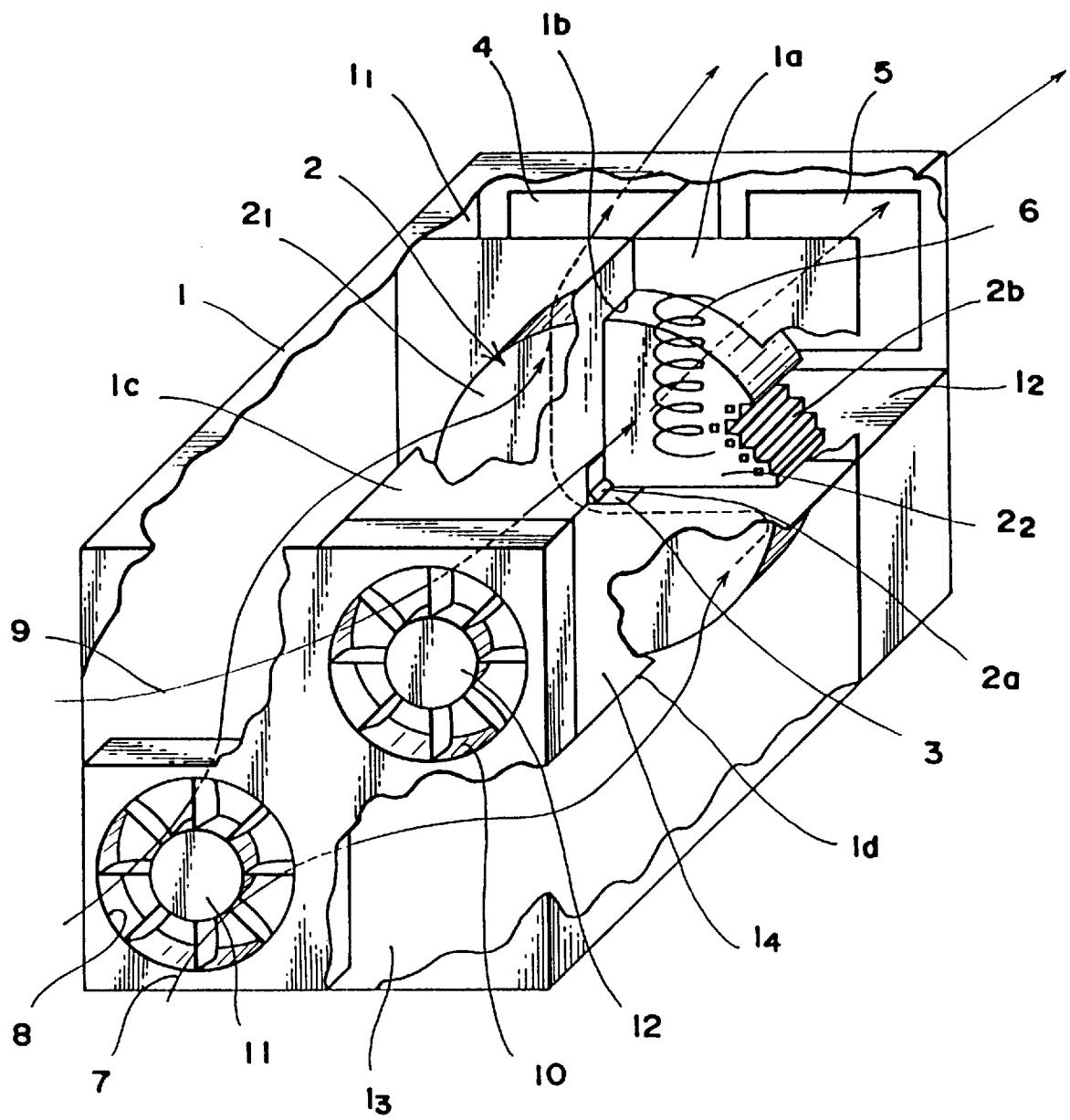
FIG. 2 is a perspective view of the moisture control unit of FIG. 1, a part of which is cut away.

First Embodiment (FIGS. 1 and 2)

A moisture control unit according to a first embodiment will be now described with reference to FIGS. 1 and 2.

In FIG. 1, a box-shaped body 1 is partitioned by a partition wall 1a into two chambers, i.e. one chamber $1_1$ and the other chamber $1_2$. A discoidal moisture absorption rotor 2 is accommodated in the chambers $1_1$ and $1_2$ in such a manner that substantially one-half thereof is accommodated in one chamber $1_1$ and the other half thereof is accommodated in the other chamber $1_2$.

The moisture absorption rotor 2 is made of a member having water vapor permeability such as porous ceramic, porous glass, porous metal, porous high polymer, non-woven fabric, paper, and a moisture absorption material such as calcium chloride, lithium chloride, magnesium chloride, potassium carbonate, magnesium nitrate, sodium hydroxide, magnesium perchlorate, silica gel, activated alumina, molecular sieves, active carbon, wherein the moisture absorption material is impregnated in or coated onto the material having water vapor permeability or made of the member having water vapor permeability per se or the moisture absorption material per se.

The moisture absorption rotor 2 is disposed substantially perpendicularly in a slit 1b formed in the partition wall 1a. Both ends of a rotary shaft 2a provided at the center of the moisture absorption rotor 2 are rotatably supported by partition wall 1a by way of a bearing 3. A dehumidifying opening 4 is defined in the chamber $1_1$ and a humidifying opening 5 is defined in the chamber $1_2$. A heater 6 is provided in the chamber $1_2$ adjacent to the moisture absorption rotor 2 and positioned opposite to the humidifying opening 5 while the moisture absorption rotor 2 is provided between the heater 6 and the humidifying opening 5.

The principle of the dehumidifying/humidifying device, i.e. moisture control unit will be now described. Supposing that humidity of air in the chamber $1_1$ is the same as that in the chamber $1_2$, weight of the moisture absorption rotor 2 per unit of volume is made the same so that the left and right portions of the moisture absorption rotor 2 are balanced with each other about the rotary shaft 2a. As a result, the moisture absorption rotor 2 does not rotate. Successively, when the heater 6 is energized to heat the moisture absorption rotor 2, water in portion $2_2$ positioned in the chamber $1_2$ is evaporated so that the balance between the left and right portions of the moisture absorption rotor 2 is lost. As a result, the portion $2_2$ in the chamber $1_2$ which is made light rotates upward while a portion $2_1$ of the moisture absorption rotor $2_1$ in the chamber $1_1$ rotates downward, and both portions $2_1$ and $2_2$ are balanced and stop at a position where they are balanced.

Since the water of the portion $2_2$, which is moved from the chamber $1_2$ to the chamber $1_1$, is evaporated so that the portion $2_2$ is dried, the portion $2_2$ absorbs moisture from the air in the chamber $1_1$ to thereby dehumidifies the chamber $1_1$.

Further, since the portion $2_1$, which is moved from the chamber $1_2$ to the chamber $1_2$, is heated by the heater 6 so that the water thereof is evaporated, thereby humidifying the air in the chamber $1_2$.

As mentioned above, the moisture absorption rotor 2 can rotate using the weight of the water which is absorbed by the moisture absorption rotor 2 but not using a rotary driving source.

Next, the structure and the operation of the moisture control unit of the first embodiment utilizing the aforementioned principle will be now described with reference to FIG. 2.

Elements which are the same as those of FIG. 1 are denoted by the same numerals and explanations thereof are omitted.

In the dehumidifying/humidifying device in FIG. 2, the body 1 is partitioned by vertical and lateral partition walls 1a, 1c and 1d into four chambers, i.e. $1_1$, $1_2$, $1_3$ and $1_4$. Air take-in ports 8 and 10 are defined in the chambers $1_3$ and $1_4$ confronting the openings 4 and 5 which are defined in the chambers $1_1$ and $1_2$, wherein air 7 to be dehumidified passes through the air take-in port 8 and air 9 to be humidified passes through the air take-in port 10.

Fans 11 and 12 are provided at inner portions of the air take-in ports 8 and 10 for taking air into the chamber $1_3$ and chamber $1_4$. The air which is taken in the chamber $1_3$ by the fan 11 reaches the moisture absorption rotor 2 and passes through the portion $2_1$ which occupies three quarters of the moisture absorption rotor 2 positioned in the chamber $1_3$, wherein the moisture of the air is absorbed in passages $2_b$ of the moisture absorption rotor 2.

The air, after the removal of the moisture thereof, is dried and discharged from the dehumidifying opening 4.

The air, which is taken in the chamber $1_4$ by the fan 12, is heated by the heater 6 which is positioned adjacent to the moisture absorption rotor 2, and then passes through the portion $2_2$ which occupies substantially one quarter of the moisture absorption rotor 2, wherein the water in the moisture absorption rotor 2 is evaporated by the air which is heated by the heater 6 and made hot.

The air, which is humidified by the evaporated vapor, passes though the chamber $1_2$ and then it is discharged from the humidifying opening 5.

In such a manner, when the dehumidifying opening 4 and the air take-in port 8 are provided at appropriate portions where the air is intended to be dehumidified, the dehumidifying/humidifying device, i.e. the moisture control unit can be used as a dehumidifier, and when the humidifying opening 5 and the air take-in port 10 are provided at appropriate portions where the air is intended to be humidified, the control unit can be used as a humidifier.

Based on the principle as explained with reference to FIG. 1, the moisture absorption rotor 2, from which the water is evaporated, rotates upward and the moisture absorption rotor 2, which absorbs the moisture and is made heavy, rotates downward, so that the moisture absorption rotor 2 can rotate by itself without needing a rotary driving means.

As mentioned in detail above, since the moisture absorption rotor 2, which dehumidifies or humidifies the air, can rotate by itself utilizing weight of the absorbed water, the moisture control unit of the first aspect of the invention can dispense with a rotary driving means or a power transmission device which have been conventionally used for rotating the moisture absorption rotor 2.

Accordingly, the moisture control unit can be small sized and manufactured with low cost, and can be operated with less noise since noise is not generated from the rotary driving means or the power transmission device. Further, since the power consumption can be reduced, a maintenance cost can be reduced.

Figure 3:
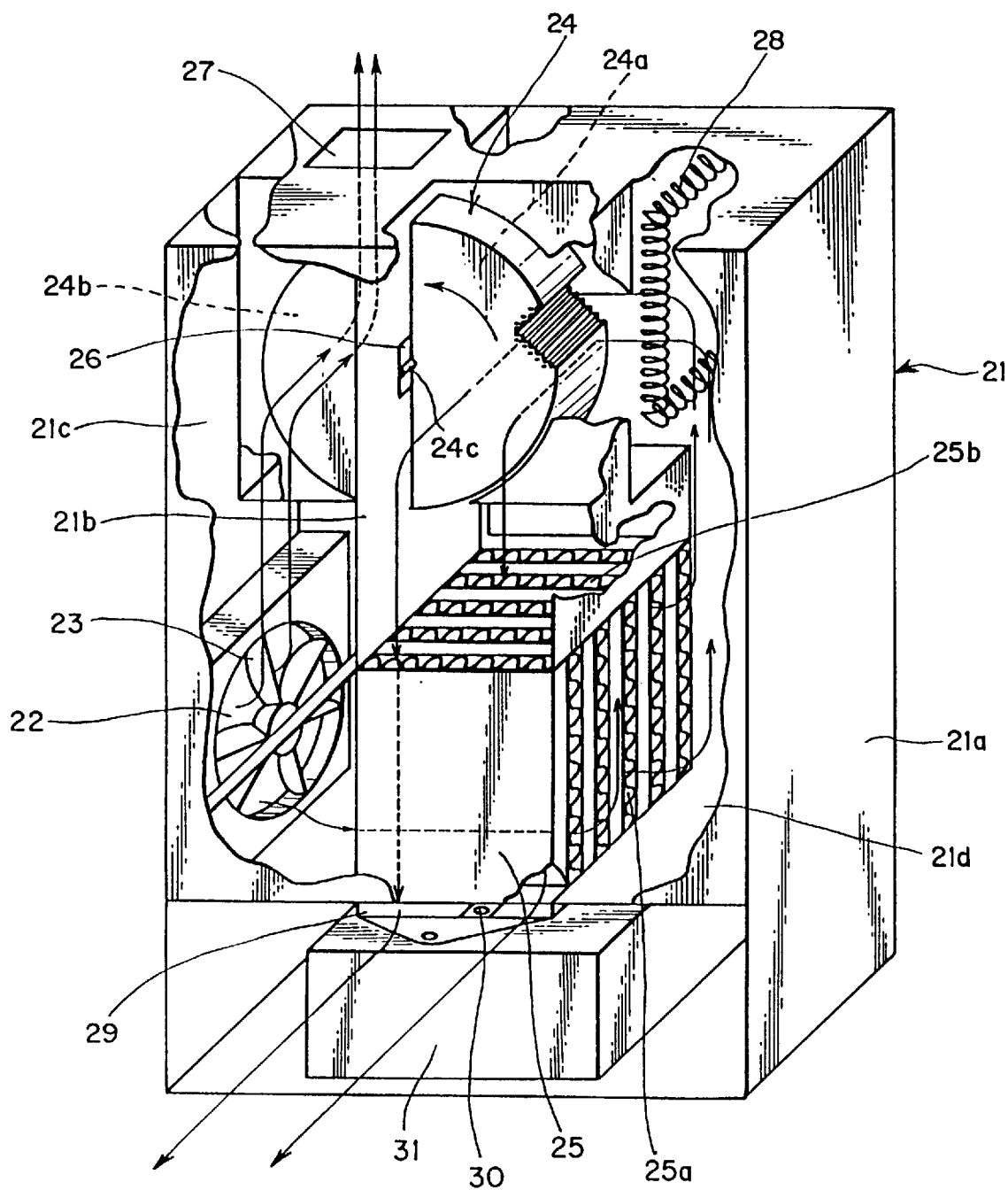
FIG. 3 is a perspective view of a dehumidifier serving as a moisture control unit according to a second embodiment of the invention.
Figure 4:
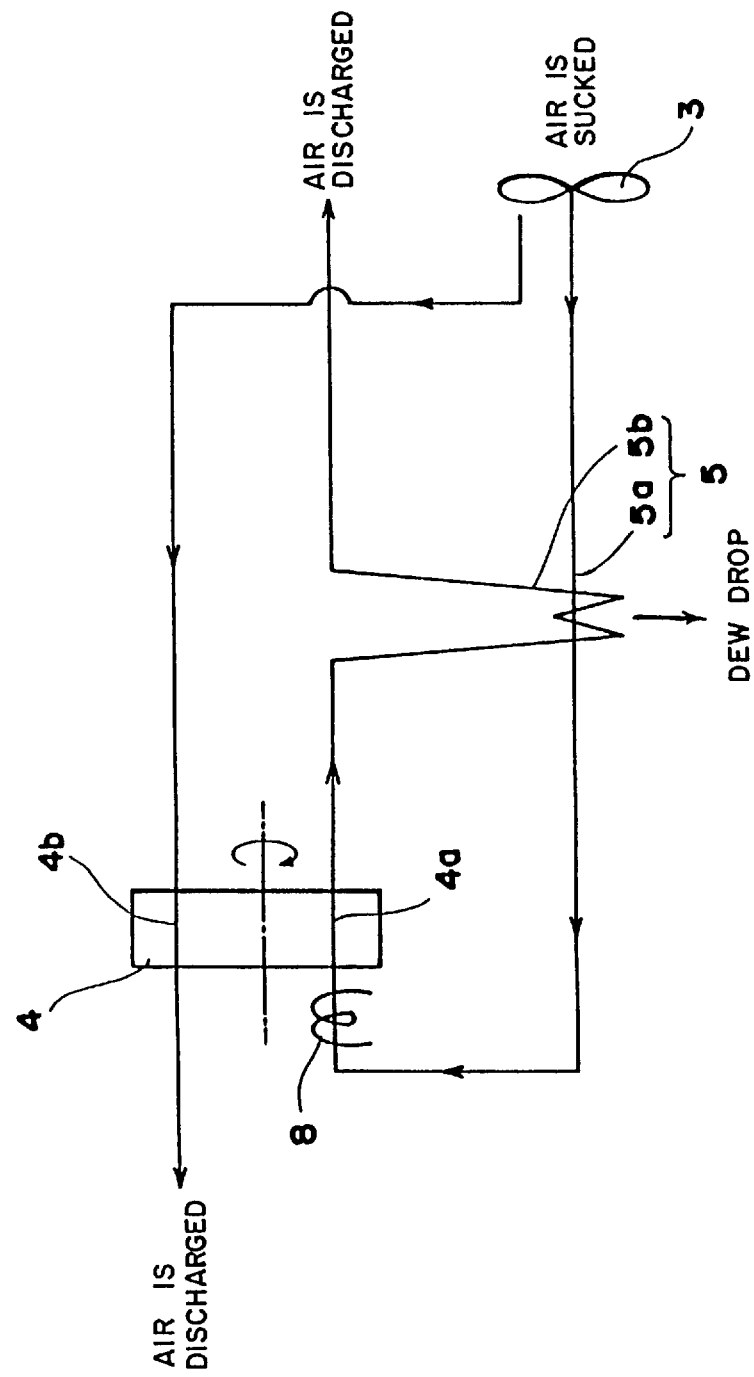
FIG. 4 is a view showing the operation of the moisture control unit of FIG. 3.
Figure 5:
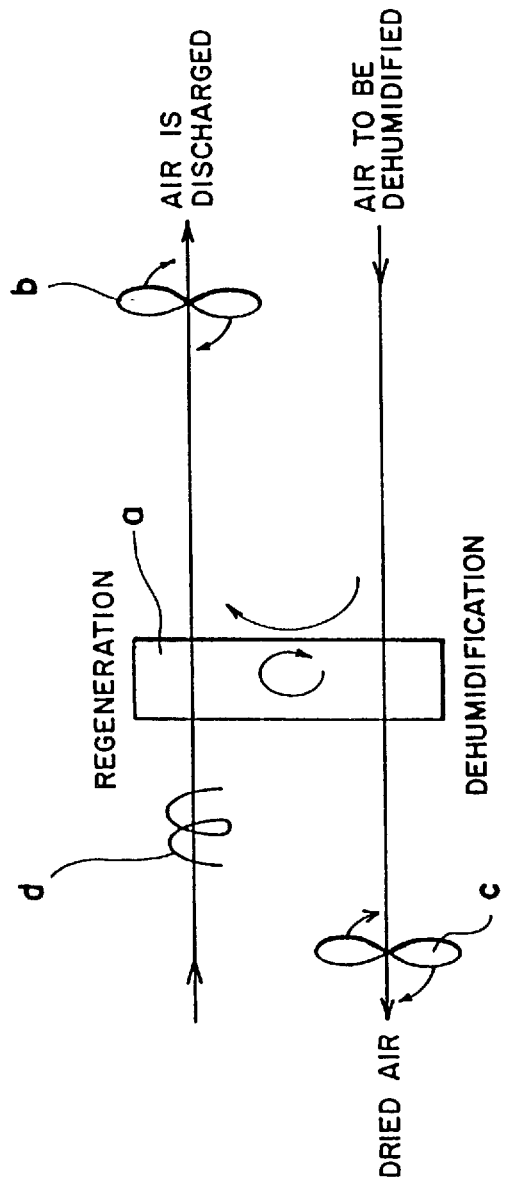
FIG. 5 is a view showing the operation of a conventional rotary dehumidifier serving as a moisture control unit.
Figure 6:
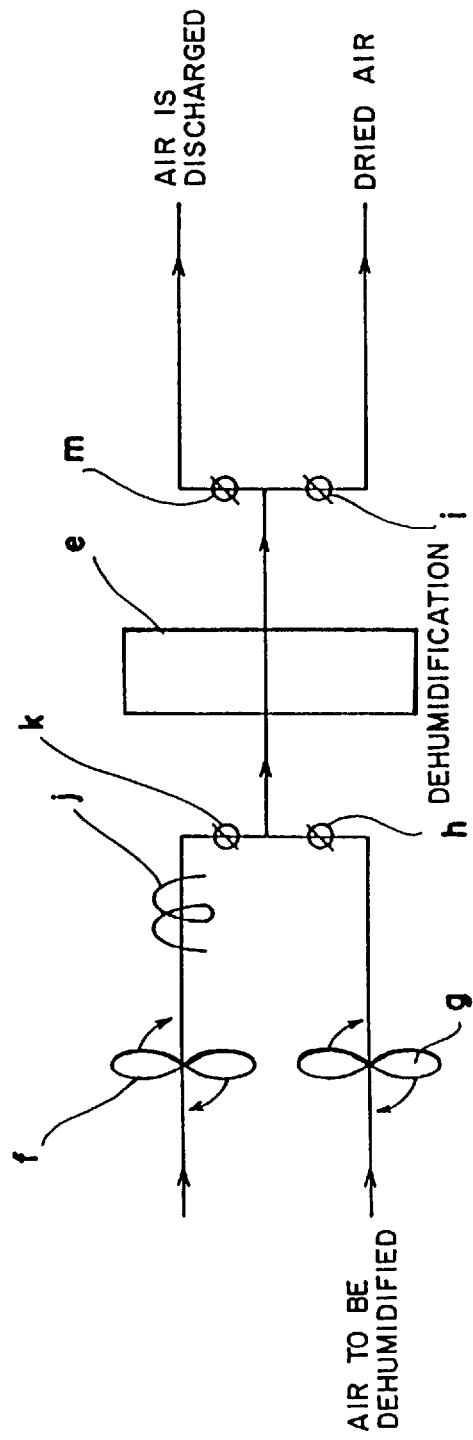
FIG. 6 is a view showing the operation of another conventional stationary dehumidifier serving as a moisture control unit.

Second Embodiment (FIG. 3 and 4)

A moisture control unit according to a second embodiment will be now described with reference to FIGS. 3 and 4, wherein FIG. 3 shows a perspective view of a dehumidifier serving as a moisture control unit, and FIG. 4 shows a view showing the operation of the moisture control unit of FIG. 3.

In FIG. 3, denoted at 21 is a body of a dehumidifier, i.e. moisture control unit composed of a box-shaped case 21a which has an inlet port 22 provided therein. A fan 23 is provided at an inner portion of the inlet port 22 for feeding fresh air therethrough. Air which is fed into the case 21a by the fan 23 passes through a passage 21c which is partitioned by a partition wall 21b and reaches a cylindrical moisture absorption rotor 24 which is disposed in the case 21a at the upper portion thereof and a sensible heat exchanger 25 which is disposed in the case 21a at the rear portion of a fan 23.

The moisture absorption rotor 24 has therein a plurality of passages 24a and 24b in which the moisture absorption material such as calcium chloride, lithium chloride, silica gel, molecular sieves is impregnated or on which the moisture absorption material is coated. The moisture absorption rotor 24 is disposed to extend over a passage 21c which is partitioned by the partition wall 21b and a chamber 21d accommodating the sensible heat exchanger 25 therein. A shaft 24c provided at the center of the moisture absorption rotor 24 is rotatably supported by the partition wall 21b by way of a bearing 26 so that the moisture absorption rotor 24 is freely rotatable in the direction of the arrow in FIG. 3. The air passed through the moisture absorption rotor 24 and dehumidified thereby is discharged outside the case 21a through an air discharge port 27.

The sensible heat exchanger 25 provided in the chamber 21d at the lower portion thereof comprises a plurality of passages 25a and a plurality of passages 25b which are made of material having high water resisting property and stacked on top of one another in layers in the direction to cross at right angles with one another, wherein the air supplied by the fan 23 is permitted to pass through the passages 25a, and the air which passed through a heater 28 provided in the chamber 21d at the upper portion thereof and the moisture absorption rotor 24 and returned to the sensible heat exchanger 25 is permitted to pass through the passages 25b. The sensible heat exchanger 25 has an air discharge port 29 at the lower portion for discharging the dehumidified air and a drop port 30 through which the dew drops at the passages 25b are discharged. A container 31 is detachably mounted under the take-in port 10 for accommodating the dew dropsunder the drop port 30.

The operation of the moisture control unit having the arrangement as set forth above will be now described.

When a power switch, not shown, is turned on to start the dehumidification, the fan 23 is rotated to feed the air from the inlet port 22. A part of the thus fed air passes through the passage 21c and reaches the moisture absorption rotor 24. The moisture in the air is absorbed by the moisture absorption rotor 24 to thereby dehumidify the air when the air passes through the passages 24b which occupies substantially half of the moisture absorption rotor 24 positioned in passage 21c.

The dehumidified and dried air is discharged through the air discharge port 27 while the moisture absorption rotor 24 absorbs the moisture in the air so that substantially half of the moisture absorption rotor 24 at the side of the passage 21c is made heavy. As a result, the moisture absorption rotor 24 rotates by itself in the direction of the arrow as shown in FIG. 3.

The air which is sucked by the fan 23 and still remains in the case 21a passes through the passages 25a of the sensible heat exchanger 25 provided at the rear portion of the fan 23 and reaches the heater 28 where it is heated to a high temperature, and the thus heated air reaches the passages 24a of the moisture absorption rotor 24 in the chamber 21d. The passages 24b of the moisture absorption rotor 24 absorb the moisture in the air at the side of the passage 21c and having a high humidity at the side of the passage 21c. As a result, the passages 24b become the passages 24a in the chamber 21d by the self rotation of the moisture absorption rotor 24. Since the hot air which is heated by the heater 28 enters the passages 24a having a high humidity, a vapor is generated and the air is made high in temperature and humidity.

When the air which was made high in temperature and humidity reaches the sensible heat exchanger 25 and passes through the passages 25b, it is cooled by the air which passes through the passages 25a so that dew is formed on the surface of the passages 25b.

The air which is dehumidified from the to formation of dew is discharged outside the case 21a through the air discharge port 29, and the dew drop formed in the passages 25b is collected in the drop port 30 through which it drops in the container 31, and it is finally stored in the container 31.

The Amount of water which is stored in the container 31 is equal to the dehumidifying amount of the air by this dehumidifier, i.e. moisture control unit. When the water is stored in the container 31 in an appropriate amount, the container 31 is taken out from the case 21a and the water is discharged. As a result, the dehumidification can be performed without needing a piping system such as a duct.

A dehumidifying process of the moisture control unit is illustrated in FIG. 4, where the arrows show direction of the air and the dew.

Although the moisture absorption rotor 24 is cylindrical in the second embodiment, it may be polygonally cylindrical or a rectangular parallelepiped body.

Further, although the moisture absorption rotor 24 is rotatably supported and it rotates by itself due to the weight of the absorbed moisture, it may be rotated by the fan 23 which is interlocked with the power transmission means or it may be rotated by a separately provided driving source.

As mentioned above, according to the second embodiment, the moisture in the air is changed to dew so that the air is taken out as the liquid phase. As a result, it does not need the piping system such as a duct which has been employed by conventionally dry dehumidifiers Accordingly, this moisture control unit can be easily installed in a room, a closet, a clog cabinet, a bathroom or a rented house where piping work can not be installed Since the air having a high temperature and humidity is discharged through the dehumidifying material is cooled by the sensible heat exchanger to form dew so that the moisture in the air is changed to water, whereby the dehumidification can be performed. As a result, the lower the temperature of the air to be sucked is, i.e. at least 0° C., the higher the dehumidifying effect is, which overcomes the drawbacks of a conventional heat pump in that the dehumidifying effect is lowered in a low temperature range. Further, since a heat pump is not used, it is possible to perform the dehumidification without much noise.

What is claimed is:

1. A moisture control unit comprising:

a housing containing a partition wall which divides the housing into at least two chambers, one of the chambers being an absorption chamber and the other chamber being a regeneration chamber;

an opening provided in an exterior wall of said housing and having a fan provided therein for feeding air into said housing;

a self-rotating moisture absorption rotor rotatably supported so that it is disposed in both the absorption chamber and the regeneration chamber, said rotor absorbing moisture in the absorption chamber and discharging moisture in the regeneration chamber and being self-rotating due to the imbalance in weight thereof caused by the absorption and discharge of moisture;

a heater disposed adjacent the moisture absorption rotor for evaporating moisture absorbed therein, and a heat exchanger provided within said housing, said heat exchanger comprising a first passageway through which a portion of the air fed by the fan flows through and is introduced to the regeneration chamber and absorbs moisture from the moisture absorption rotor and a second passageway through which the air having the absorbed moisture from the regeneration chamber flows through, said first and second passageways being in heat exchange relationship with each other.

2. A moisture control unit comprising:

a housing;

an opening provided in an exterior wall of said housing and having a fan provided therein for feeding air into said housing;

a self-rotating moisture absorption rotor rotatably supported in said housing and being self-rotating due to the imbalance in weight thereof caused by the absorption and discharge of moisture;

a heater provided in the housing for evaporating moisture from the moisture absorption rotor;

a heat exchanger provided within the housing, said heat exchanger comprising a first passageway through which a portion of the air fed by the fan flows through to the moisture absorption rotor and removes moisture therefrom and a second passageway through which the air having the absorbed moisture flows through and forms dew therein to dehumidify the air, said first and second passageways being in heat exchange relationship with each other; and a discharge opening through which another portion of the air fed by the fan exits the housing after contacting with the moisture absorption rotor and being dehumidified thereby.

* * * * *